Sept. 2, 1947.　　　　L. E. BLAZEY　　　　2,426,664
BELL CASTER
Filed Sept. 17, 1945
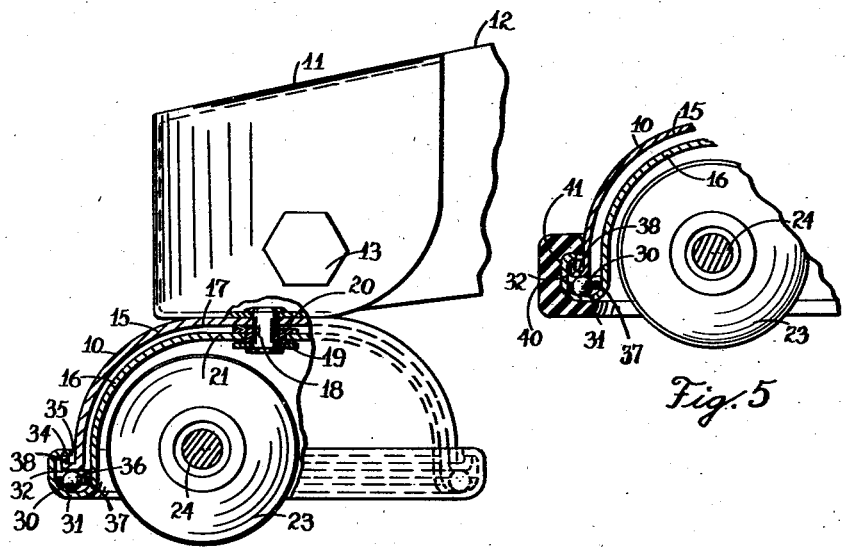
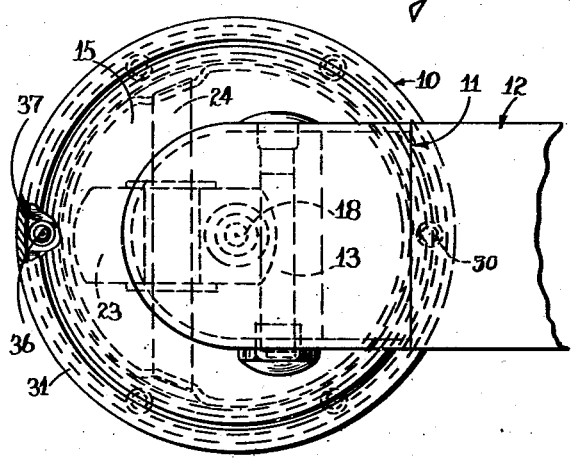
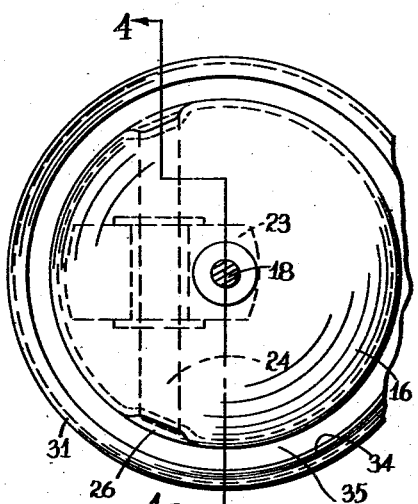
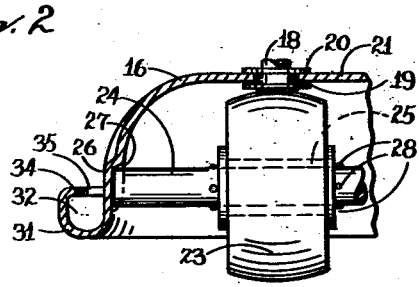
INVENTOR.
LAWRENCE E. BLAZEY
BY
Kwis Hudson Baughton & Williams
ATTORNEYS Patented Sept. 2, 1947

2,426,664

UNITED STATES PATENT OFFICE 2,426,664

BELL CASTER

Lawrence E. Blazey, Bay Village, Ohio, assignor, by mesne assignments, to Office Furniture & Fixtures, Inc., Washington, D. C., a corporation of Delaware Application September 17, 1945, Serial No. 616,897

2 Claims. (Cl. 16—31)

This invention relates to casters and, as one of its objects, aims to provide an improved construction for casters of the type used for supporting articles of furniture and various other movable objects.

Another object of this invention is to provide an improved caster which can be economically manufactured, is of an attractive and streamlined appearance and is rugged and durable for rendering prolonged efficient service.

A further object of the present invention is to provide an improved caster embodying nested bell- or dome-shaped members and in which rim portions of these members are shaped to define cooperating races of an antifriction bearing.

Still another object of the invention is to provide an improved caster of this character, in which the roller is housed and concealed in a caster body formed by the dome-shaped members and in which a non-metallic guard ring or bumper is mounted on the caster body.

The invention can be further briefly summarized as consisting in certain novel combinations and arrangements of parts hereinafter described and particularly set out in the appended claims.

In the accompanying sheet of drawings,

Fig. 1 is a side elevation, partly in vertical section, showing a caster embodying this invention.

Fig. 2 is a top plan view of the caster.

Fig. 3 is a plan view of the inner member of the caster showing the same with the roller mounted therein.

Fig. 4 is a partial transverse sectional view taken through the inner member as indicated by line 4—4 of Fig. 3, and further illustrating the mounting of the roller, and Fig. 5 is a partial vertical sectional view of the same caster but with a guard ring mounted thereon.

For a more detailed description of the invention further reference will now be made to the particular embodiment of the invention illustrated in the drawing. The improved caster 10 is here shown as being connected with a mounting member 11 which is in the form of a metal socket or shell adapted to receive a portion of the member 12 to be supported. In this instance the member 12 is a wooden leg of a swivel chair and the shell 11 has a lateral opening into which the end of the leg extends. The shell is retained on the leg as by means of the bolt 13 extending through the leg and side walls of the shell. Although the caster 10 is here shown as being provided with the socket or shell 11 and applied to the leg of a swivel chair, it should be understood that the caster can be applied to various other uses and can be mounted on the object to be supported in various ways other than by the use of such a socket member.

The body of the caster 10 is formed by a pair of nested dome-shaped or bell-shaped outer and inner sheet metal members 15 and 16. The outer member 15 has its transverse top wall 17 rigidly attached to the bottom of the socket member 11 as by being welded or otherwise connected thereto. The inner member 16 is somewhat smaller than the member 15 and is pivotally mounted in the latter by means of a headed pivot pin 18 which extends through the top walls of the members 15 and 16 and through the bottom wall of the socket member 11. The member 16 is supported on the pivot pin 18 by means of washers 19 and 20 lying on opposite sides of its transverse top wall 21 and one of which washers, in this instance the washer 20, is a shouldered washer which prevents the top wall from being tightly clamped by the pivot means.

The improved caster 10 also includes a suitable roller 23 which is housed and more or less concealed in the dome-shaped member 16. The roller 23 is rotatably mounted on a transverse shaft or axle 24 which is offset laterally from the axis of the pivot pin 18. The roller 23 may be made of wood, hard rubber, plastic, metal or any other suitable material and is preferably provided with a bushing 25 extending therethrough and by which the roller is journalled on the axle 24.

To facilitate the mounting of the roller 23 in the dome-shaped member 16 the latter is preferably provided with a pair of relatively inclined opposed seats 26 which are stamped or otherwise formed on the wall of this member and which are engaged by the ends of the axle 24. The ends of the axle are beveled to the angle of inclination of the seats 26 and are connected to the latter by means of welding or the like indicated at 27. The roller 23 is confined to a central section of the axle 24 so that it will rotate in the vertical plane which includes the axis of the pivot pin 18. The roller can be confined to this central section by the use of any suitable confining means on the axle 24 and in this instance the axle has integral projections 28 thereon for this purpose and which provide a so-called "staked" mounting for the roller.

An important feature of the present invention is the provision of an antifriction bearing 30 disposed between the rim portions of the dome-shaped members 15 and 16 and through which the load is transmitted from the outer or load-receiving member 15 to the inner or roller-carrying member 16. The rim of one of the dome-shaped members, in this instance the inner member 16, is hollow and shaped so as to form an annularly extending bearing race 31 containing an upwardly opening channel recess 32. The extreme edge of hollow rim is deflected laterally as a short annular flange 34 which overhangs the channel recess 32 and cooperates with the wall of the member 16 in defining an annular slot 35 opening into the channel recess. An annular group of antifriction elements, such as the balls 36, is disposed in the channel recess 32 and the individual elements are maintained in a desired annularly spaced relation by a suitable cage or retainer 37.

The rim or lip of the outer dome-shaped member 15 extends through the annular slot 35 into the channel recess 32 and carries a bearing race 38 which engages the antifriction elements 36 and is supported thereon. The race 38 is preferably formed as an integral part of the rim of the dome-shaped member 15 as by deflecting the edge of the rim laterally and upwardly to define a hook-shaped or channel-shaped cross-section having a substantially flat annular bottom face which engages the anti-friction elements 36. In addition to their function as bearing races, the channel-shaped rims thus provided on the dome-shaped members 15 and 16 materially strengthen these members. It will also be seen that the hook portion of the race 38 extends beneath the lateral flange 34 so that these portions cooperate in forming a retaining means which prevents separation of the dome-shaped members and seals the anti-friction bearing against the entry of dust and other foreign matter.

From the construction of the improved caster as above described, it will be seen that the outer dome-shaped member 15 receives the load from the chair leg 12 and transmits it through the antifriction bearing 30 to the hollow rim of the inner dome-shaped member 16 which is supported by the roller 23. It will be seen also that since the roller 23 is offset or eccentric with respect to the axis of the pivot pin 18, the inner dome-shaped member will readily swivel in the outer dome-shaped member for adjusting itself to any direction of movement.

Fig. 5 shows the caster 10 with a bumper or guard ring 40 mounted thereon. This guard ring may be formed of any suitable material such as a resilient soft-vulcanized rubber and may be molded or otherwise formed so as to contain an internal groove 41 in which the hollow rim 31 of the caster body engages when the guard ring is applied to the caster. The engagement of this guard ring over the hollow rim of the caster body causes the guard ring to be retained thereon and serve as a bumper element for receiving blows or shocks incident to engagement of the caster with other objects.

From the foregoing description and the accompanying drawing, it will now be readily understood that this invention provides an improved construction for a caster and imparts to the caster an attractive and streamlined appearance, as well as a desired ruggedness for durability and a desired simplicity for economy of manufacture and assembly. It will be seen, moreover, that in the improved caster the roller is housed and concealed by the caster body and that the load-carrying antifriction bearing embodied in the caster is substantially enclosed and protected against the entry of dust and other foreign matter.

Although the improved caster has been illustrated and described herein in considerable detail, the invention is not to be regarded as being correspondingly limited in scope but includes all changes and modifications coming within the scope of the appended claims.

Having thus described my invention, I claim:

1. A caster comprising a pair of nested inner and outer substantially dome-shaped sheet metal members, pivot means mounting the inner member for pivotal movement in the outer member, the inner dome-shaped member having an outwardly extending upturned rim defining a channel recess having an annular opening around the top thereof and formed with a bearing race at the bottom thereof, an annular group of anti-friction elements disposed in said channel recess, said channel recess having a depth substantially greater than the diameter of said anti-friction elements, the other of said dome-shaped members having an annular rim extending into said channel recess substantially closing the top of the same and providing an upper bearing race complemental to the bearing race at the bottom of said channel recess.

2. A caster comprising a pair of nested inner and outer substantially dome-shaped sheet metal members, pivot means mounting the inner member for pivotal movement in the outer member, the inner dome-shaped member having an outwardly extending upturned rim defining a channel recess having an annular opening around the top thereof and formed with a bearing race at the bottom thereof, an annular group of anti-friction elements disposed in said channel recess, said channel recess having a depth substantially greater than the diameter of said anti-friction elements, the other of said dome-shaped members having an annular rim extending into said channel recess substantially closing the top of the same and providing an upper bearing race complemental to the bearing race at the bottom of said channel recess, said channel recess having an inwardly extending annular flange adapted to be positioned above and to retain the annular rim of said outer dome-shaped member.

LAWRENCE E. BLAZEY.

REFERENCES CITED

The following references are of record in the file of this patent:

UNITED STATES PATENTS

| Number | Name | Date |
| --- | --- | --- |
| 1,743,255 | Vervoort | Jan. 14, 1930 |
| 2,290,001 | Sherman | July 14, 1942 |
| 1,296,764 | Chesnutt | Mar. 11, 1919 |
| 137,251 | Sheldon | Mar. 25, 1873 |
| 1,665,882 | Jarvis et al. | Apr. 10, 1928 |